US006005978A

United States Patent [19]

Garakani

[11] Patent Number: 6,005,978

[45] **Date of Patent: *Dec. 21, 1999**

[54] ROBUST SEARCH FOR IMAGE FEATURES ACROSS IMAGE SEQUENCES EXHIBITING NON-UNIFORM CHANGES IN BRIGHTNESS

[75] Inventor: Arman Garakani, Welleiley, Mass.

[73] Assignee: Cognex Corporation, Natick, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/597,653

[22] Filed: Feb. 7, 1996

[51] Int. Cl.[6] .............................. G06K 9/48; G06K 9/68

[52] U.S. Cl. .............................. 382/218; 382/151; 382/199; 382/203

[58] Field of Search .............................. 382/103, 151, 382/190, 191, 192, 194, 195, 197, 199, 201, 203, 204, 205, 206, 260, 263, 266, 269, 273, 274, 291, 294, 281, 282, 218; 348/169

[56] References Cited

U.S. PATENT DOCUMENTS

| | | | |
|---|---|---|---|
| 4,644,582 | 2/1987 | Morishita et al. | 382/294 |
| 4,860,371 | 8/1989 | Matsuyama et al. | 382/8 |
| 4,965,842 | 10/1990 | Crossley et al. | 382/8 |
| 5,048,103 | 9/1991 | Leclerc et al. | 382/294 |
| 5,109,430 | 4/1992 | Nishihara et al. | 382/8 |
| 5,119,444 | 6/1992 | Nishihara | 382/45 |
| 5,168,530 | 12/1992 | Peregrim et al. | 382/294 |
| 5,189,708 | 2/1993 | Cox et al. | 382/159 |
| 5,311,600 | 5/1994 | Aghajan et al. | 382/156 |
| 5,317,644 | 5/1994 | Kenyon et al. | 382/6 |
| 5,351,314 | 9/1994 | Vaezi | 382/54 |
| 5,504,133 | 4/1996 | Murouchi et al. | 524/430 |
| 5,537,669 | 7/1996 | Evans et al. | 382/294 |
| 5,550,937 | 8/1996 | Bell et al. | 382/294 |
| 5,585,926 | 12/1996 | Fujii et al. | 358/471 |
| 5,604,819 | 2/1997 | Barnard | 382/151 |
| 5,611,000 | 3/1997 | Szeliski et al. | 382/294 |
| 5,617,459 | 4/1997 | Makram-Ebeid et al. | 382/132 |
| 5,639,990 | 6/1997 | Nishihara et al. | 174/52.2 |
| 5,640,380 | 6/1997 | Saimi et al. | 369/112 |
| 5,682,515 | 10/1997 | Lau et al. | 395/455 |

OTHER PUBLICATIONS

A Survey of Image Registration Techniques, Lisa Gottesfeld Brown, *ACM Computing Surveys*, vol. 24, No. 4, Dec. 1992.

Measuring Photolithographic Overlay Accuracy and Critical Dimensions by Correlating Binarized Laplacian of Gaussian Convolutions, H. Keith Nishihara and P.A. Crossley, *IEEE Transactions on Pattern Analysis and Machine Intelligence*, vol. 10, No. 1, Jan. 1988.

*Primary Examiner*—Matthew C. Bella
*Attorney, Agent, or Firm*—Russ Weinzimmer; Tracy Calabresi

[57] ABSTRACT

An apparatus and method for two-dimensional search for a model image within atest image that exploits edge-based matching of edge maps, followed by area-based matching of at least coarse resolution edge maps of respective multi-resolution edge-maps, to efficiently and accurately provide the position of at least one instance of the model image. The invention can find a location of the model image within each test image of a sequence of test images, even when there are non-uniform brightness changes in the test image due to process steps or lighting changes. The postion of each verified instance of the model image within the test image can be provided to an alignment device, a measurement device, or any other device that can use such position information.

26 Claims, 14 Drawing Sheets

ROBUST SEARCH FOR IMAGE FEATURES ACROSS IMAGE SEQUENCES EXHIBITING NON-UNIFORM CHANGES IN BRIGHTNESS

FIELD OF THE INVENTION

This invention relates generally to machine vision systems, and particularly to machine vision systems having a capacity to search for image features that correspond to object features.

BACKGROUND OF THE INVENTION

Many electronic and optical devices are currently produced using planar fabrication processes wherein one or more devices are fabricated on a planar substrate. Planar fabrication processes typically include a sequence of process steps. Such process steps can include thin-film or thick-film deposition, chemical and/or mechanical polishing, diffusion of dopants, and metalization, for example. Commonly, it is necessary to perform an alignment step after a process step. For example, an alignment step is required to return to the same location on a substrate to perform a measurement after a process step, as in a wafer prober, or a film thickness measurement system, or a flatness probe station. Another example is the alignment step required to register a lithography mask with respect to a previously fabricated pattern on the surface of the substrate, as in a wafer stepper.

However, a process step can cause a change in the appearance of the nascent device and/or the substrate upon which the device is being fabricated. Such changes can result in, for example, a non-uniform change in brightness over the area of an image of the device and/or substrate. That is to say, there is no single linear transformation of the brightness of each pixel in the pre-process-step image that will provide the post-process-step image. Instead, two or more different transformations are applied over respective sub-areas of the image to provide the post-process-step image. When confronted with images exhibiting non-uniform changes in pixel brightness between process steps, alignment based on such images can become problematic using known automated vision-based alignment methods, such as normalized correlation search.

Note that non-uniform changes in pixel brightness across a sequence of images of an object could also result from a change in lighting conditions over the sequence of images.

FIG. 1 illustrates a sample reference feature both before and after 10' a hypothetical process step that causes a non-uniform change in image brightness (gray value). The gray values G0, G1, and G2 of the three regions 12, 14, and 16, respectively, of the image 10 are shown, and the corresponding magnitude of the first difference (rate of change of gray value with position) plot 18 across the image is indicated immediately below.

For comparison, after a hypothetical substrate processing step, such as a semiconductor wafer process step or thin film process step, the gray values G1, G0, and G2 of each of three regions 12', 14' and 16' (where the prime (') indicates a post-process image) of the image 10' are shown, and the corresponding magnitude of the first difference 18' taken across the image is indicated immediately below. Thus, each process step can introduce a change in image polarity over the area of an image, or other non-uniform change in gray value over the image area, which is manifest as a non-uniform transformation over the first difference of the image. The change in the first difference image is non-uniform in that no single linear transformation over the entire pre-process first difference image can be found that can provide the post-process version of the first difference image. It is possible, however, to find a piece-wise linear or non-uniform linear transformation.

Such non-uniform changes in the first difference of the image can introduce further difficulty for some known search techniques, and particularly for search methods that employ edge thresholding, wherein only strong edges that exceed a threshold are deemed valid. This is because some substrate processing steps can reduce the strength of otherwise valid edges, and such edge information is not available to facilitate image searching.

Further, substrate processing steps can cause non-uniform changes in image gray values over the area of an image of the substrate that can introduce further difficulty for known search techniques, and particularly for techniques that employ normalized correlation search based solely on correlation of areas of image gray values.

In an attempt to overcome this difficulty, the SEARCH TOOL, an application of normalized correlation search sold by Cognex Corporation, Natick, Mass., requires that a different search model of the reference feature be trained for use after each process step, whenever each process step can change the appearance of the reference feature on the wafer in a non-uniform manner. However, this approach is impractical, because each processing step can have an unpredictable effect on the brightness, contrast, location, orientation, and/or scale of the reference feature, making it difficult to train a suitable sequence of search models. Moreover, even if a stable sequence of search models could be found for finding an image feature throughout a sequence of process steps, such an approach is time consuming and costly.

It is also known to compute a Sobel magnitude image of the reference feature on the wafer after each step of a sequence of process steps, and search the Sobel magnitude image using a Sobel magnitude image of the model image. However, in this case, the Sobel magnitude image changes in a non-uniform or non-linear manner after each process step. Further, the Sobel magnitude image may not work well in conjunction with some implementations of normalized correlation search. To overcome this problem, custom application-specific image pre-processing must be employed. The result is not necessarily adequate for many applications.

SUMMARY OF THE INVENTION

The invention provides an apparatus and method for two-dimensional search for a model image within a test image that exploits edge-based matching of edge maps, followed by area-based matching of at least coarse resolution edge maps of respective multi-resolution edge-maps, to efficiently and accurately provide the position of at least one instance of the model image. The invention can find a location of the model image within each test image of a sequence of test images, even when there are non-uniform brightness changes in the test image due to process steps or lighting changes.

In a preferred embodiment, the area-based matching technique used to perform matching of edge maps is normalized correlation. In a further preferred embodiment, the area-based matching technique employs an improved normalized correlation for binary images, such as edge maps having only ‘zero’ (no-edge) and ‘one’ (edge) image elements, wherein the correlation value is reduced by only a fraction of the number of non-edge pixels in the edge map of the model image that overlie edge pixels in the edge map of the test image at each candidate location of the model image, and by only a fraction of the number of edge pixels in the edge map of the model image that overlie non-edge pixels in the edge map of the test image at each candidate location of the model image. By contrast, in standard normalized correlation, the correlation value is reduced by the entire number of non-edge pixels in the edge map of the model image that overlie edge pixels in the edge map of the test image at each candidate location of the model image, and by the entire number of edge pixels in the edge map of the model image that overlie non-edge pixels in the edge map of the test image at each candidate location of the model image. This improved version of normalized corrlation for binary images provides a match score that is a smooth function of brightness change over the area of an image, where both the model image and the test image are binary, i.e., consist solely of 'zero' and 'one' pixel values.

In a preferred embodiment, multi-resolution edge maps of the model images and test images are generated using a Gaussian Pyramid, with edge detection performed at each resolution level, although other multi-resolution image representations can also be used. Also in a preferred embodiment, General Hough Transform (GHT) is used for edge-based matching of edge maps, although other techniques for matching edge maps of complexity O(e) can be employed.

The method and apparatus of the invention finds an image feature or model image, i.e., an image of a "known good" sample, object, or feature within a test image, i.e., an image of a scene that may contain the sample, object, or feature, by first constructing, at train-time, a multi-resolution image, and then an edge map of at least the coarsest resolution of the model image.

At run-time, using the General Hough Transform, an edge map of the coarsest resolution of the test image is transformed by the edge map of the coarsest resolution of the model image to provide a match-metric surface. At this coarsest level, the resulting match-metric surface is then analyzed to determine at least the height of each local maximum of the surface.

Next, all local maxima above an acceptance threshold are further examined using an area-based edge map matching technique using at least the coarsest level of the multi-resolution edge maps. The user specifies the resolution level(s) of the multi-resolution edge map at which an area-based match step is to be performed. The level(s) selected depends generally on the test image to be searched, and particularly on a determination of which resolution levels of the test image include the most distinguishable features. In a preferred embodiment, the user can select evaluation at either the coarse, or the coarse and the fine resolution levels in a multi-resolution edge map of two levels. In general, the multi-resolution image can have more than two levels, and area-based matching of edge maps can occur at more than one resolution level. In general, area-based matching of edge maps can be performed using edge pixel magnitude and/or edge pixel direction. Further, both edge and non-edge pixel information can be exploited.

Successful evaluation of a local maximum is achieved when the area-based edge map matching step returns a match value that exceeds a user-selected threshold at each user-selected resolution level.

The position of each successfully verified local maximum represents a location of the model image within the test image, and this position information can be provided to an alignment device, such as a wafer stepper, or a measurement device, or any other device that can use such position information.

The invention can accommodate a wide range of non-uniform brightness changes throughout a sequence of process steps using only a single template. The invention can also accommodate small changes in test image orientation and/or scale.

BRIEF DESCRIPTION OF THE DRAWINGS

The invention will be more fully understood from the following detailed description, in conjunction with the accompanying figures, wherein.

No FIG. 7

Figure 3:
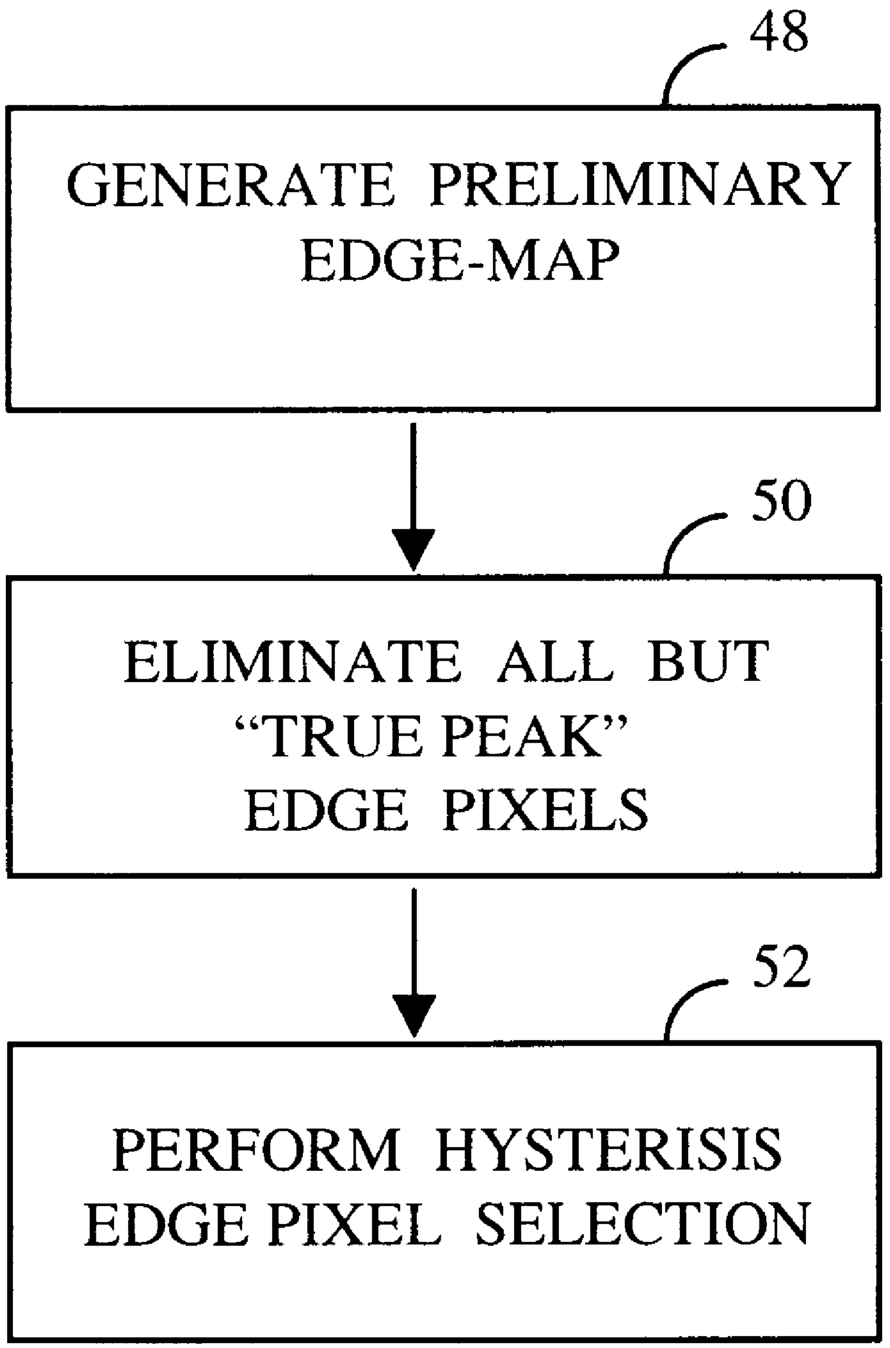
FIG. 3 is a flow chart of the steps for generating the edge-map of FIG. 2.
Figure 8:
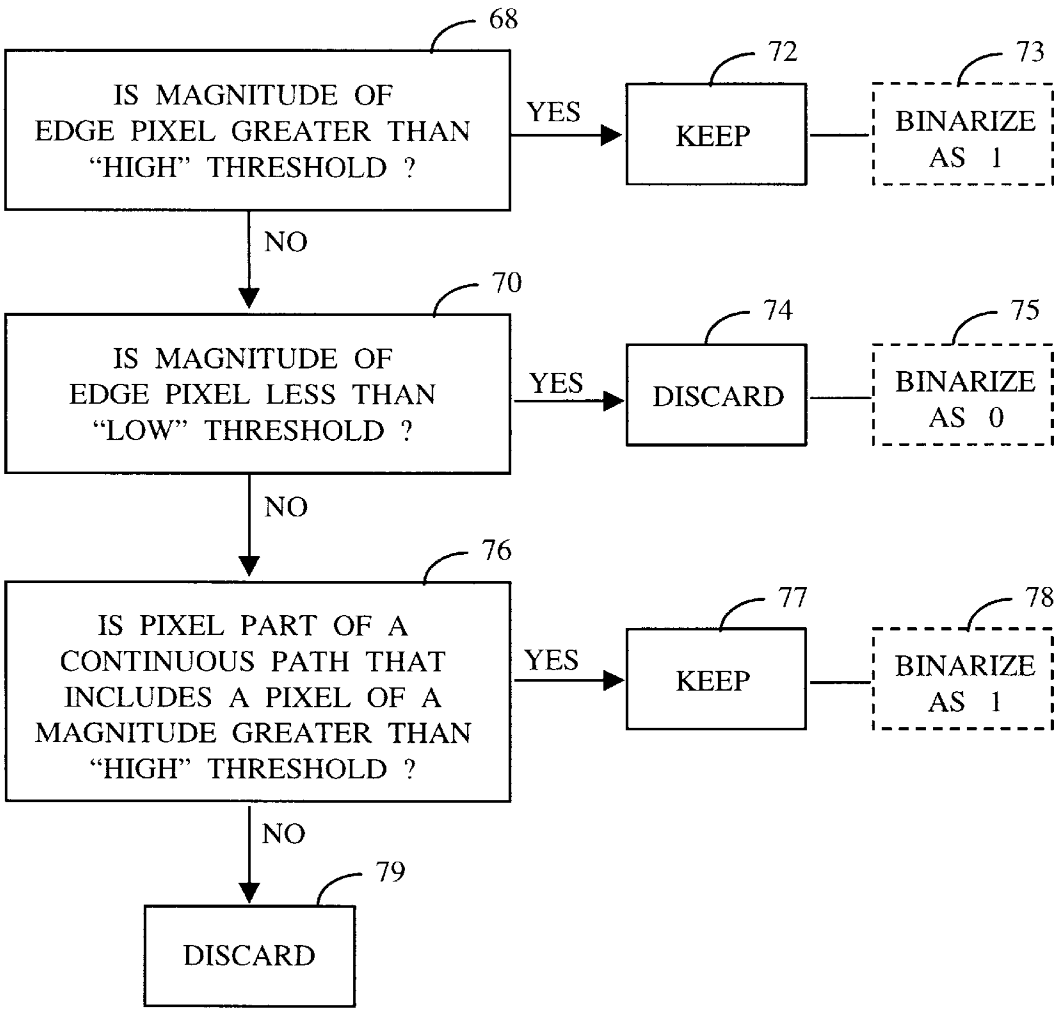

FIG. 8 is a flow chart of the step of hysterisis edge pixel selection of FIG. 3

Figure 9:
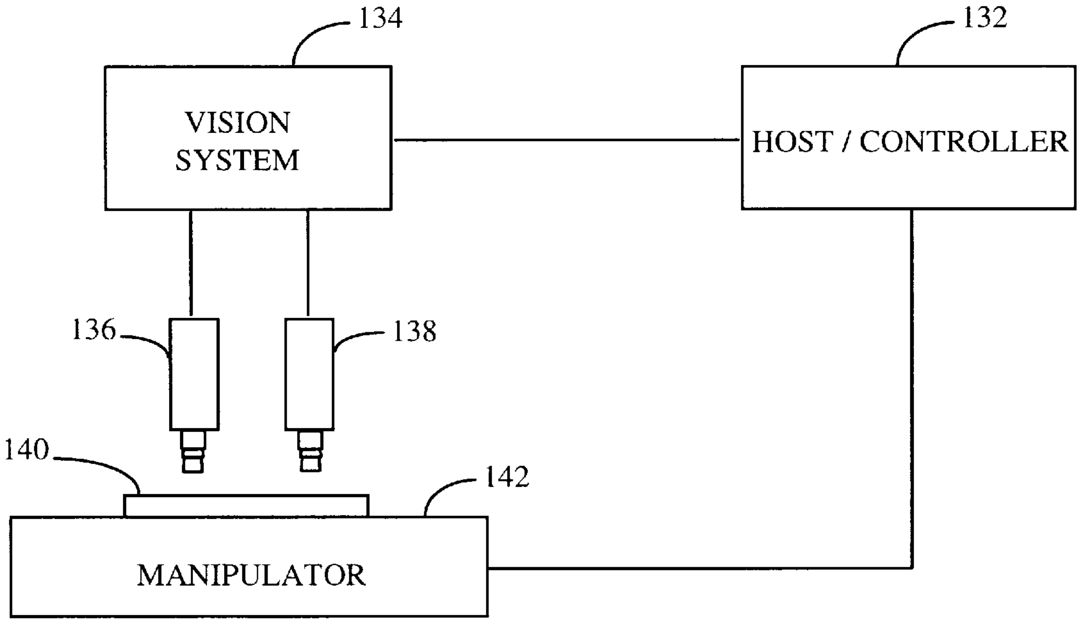
Figure 10A:
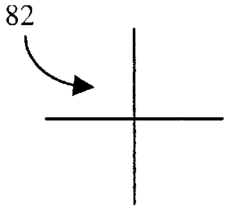
Figure 10B:
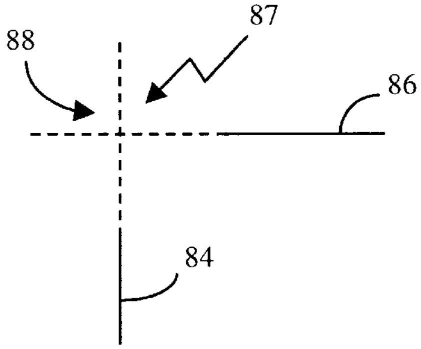
Figure 11:
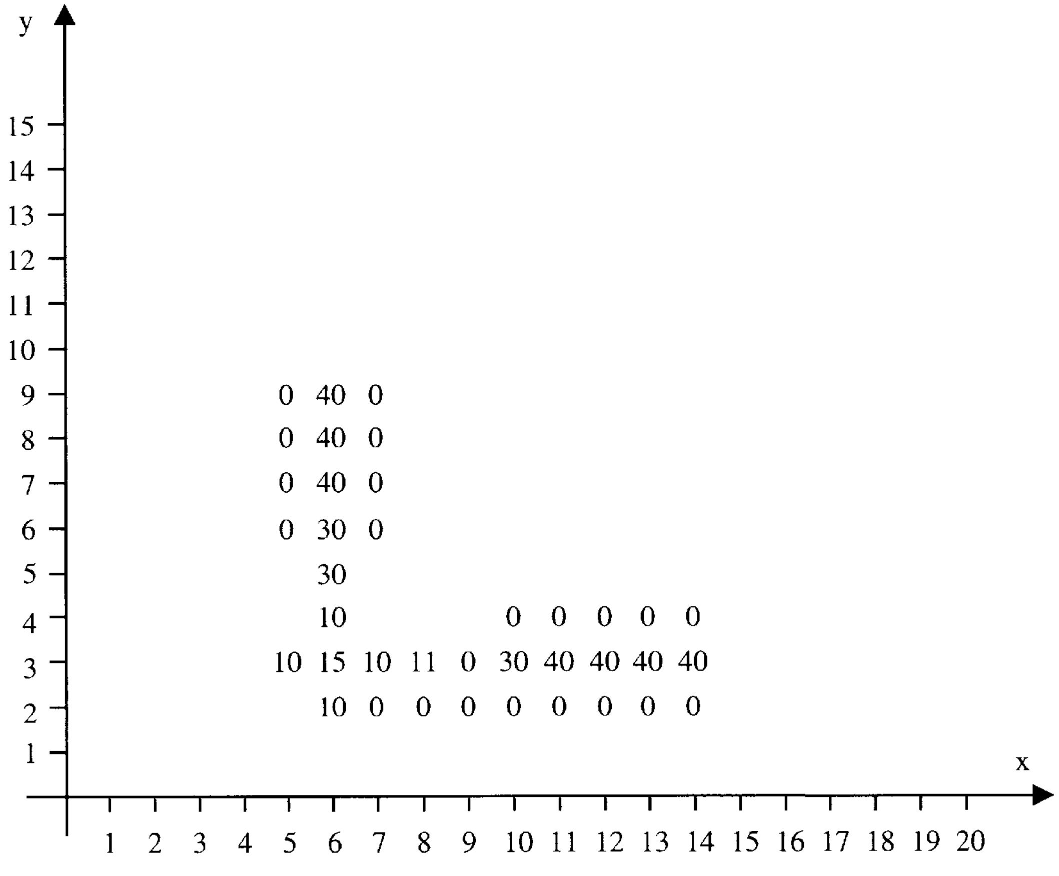
Figure 12:
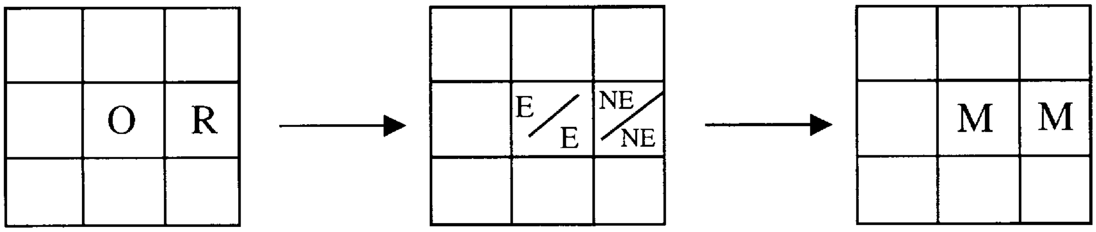
Figure 13A:
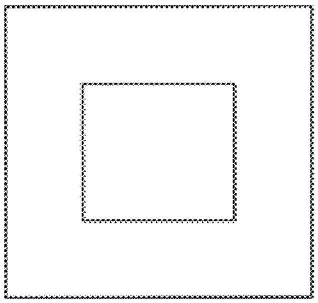
Figure 13B:
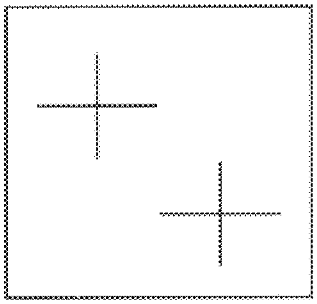
Figure 13C:
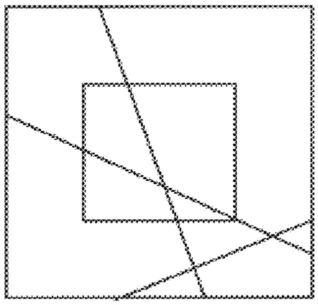
Figure 14A:
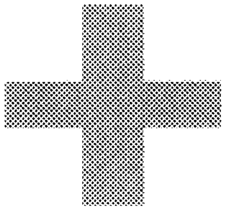
Figure 14B:
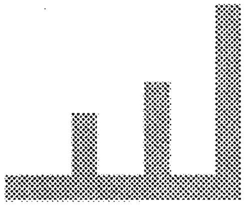
Figure 14C:
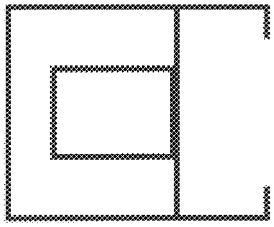
Figure 15A:
Figure 15B:
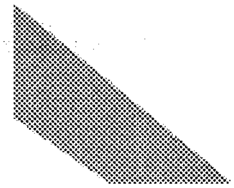
Figure 16A:
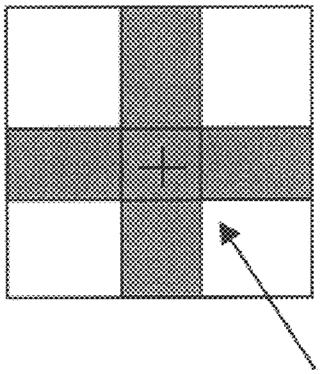
Figure 16B:
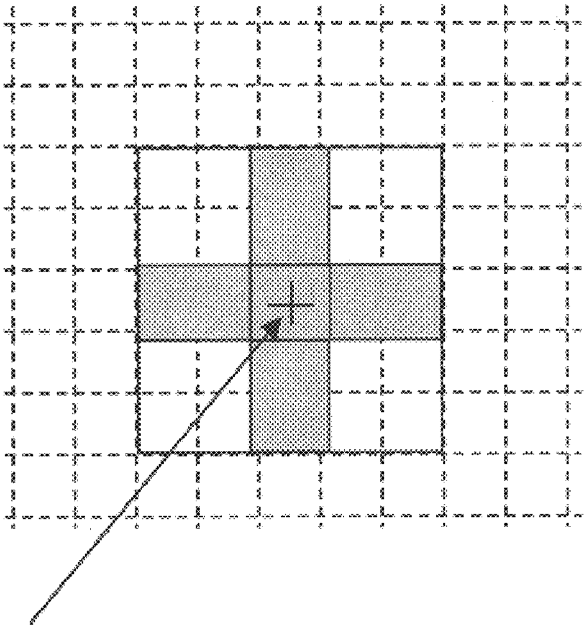
Figure 17:
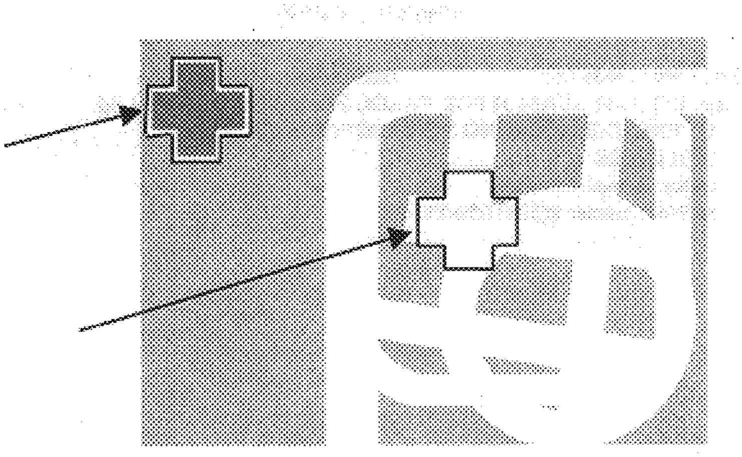
Figure 18A:
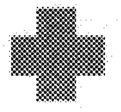
Figure 18B:
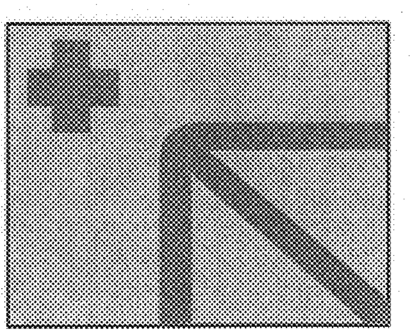
Figure 18C:
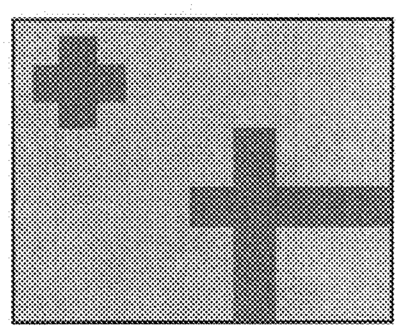

FIG. 9 is a block diagram of an application of the apparatus of the invention;

FIG. 10A is an instance of a model image;

FIG. 10B is an instance of an image that can be confused with the model image of FIG. 10A;

FIG. 11 is a plot of edge values;

FIG. 12 is an illustration of how an edge quantization error is fixed according to the invention;

FIGS. 13A, 13B, and 13C are a model image edge map, and two test image edge maps, respectively;

FIG. 14 includes three instances of good models;

FIG. 15 includes to instances of poor models;

FIG. 16 is a graphical representation illustrating the respective degree of match for two relative displacements of a model image with respect to a test image;

FIG. 17 is an example of one technique to estimate a confusion score;

FIG. 18A is an example of a model image;

FIG. 18B is an example of a test image with a low degree of confusion with respect to the model image of FIG. 18A; and FIG. 18C is an example of a test image with a high degree of confusion with respect to the model image of FIG. 18A.

DETAILED DESCRIPTION OF THE DRAWINGS

Figure 1:
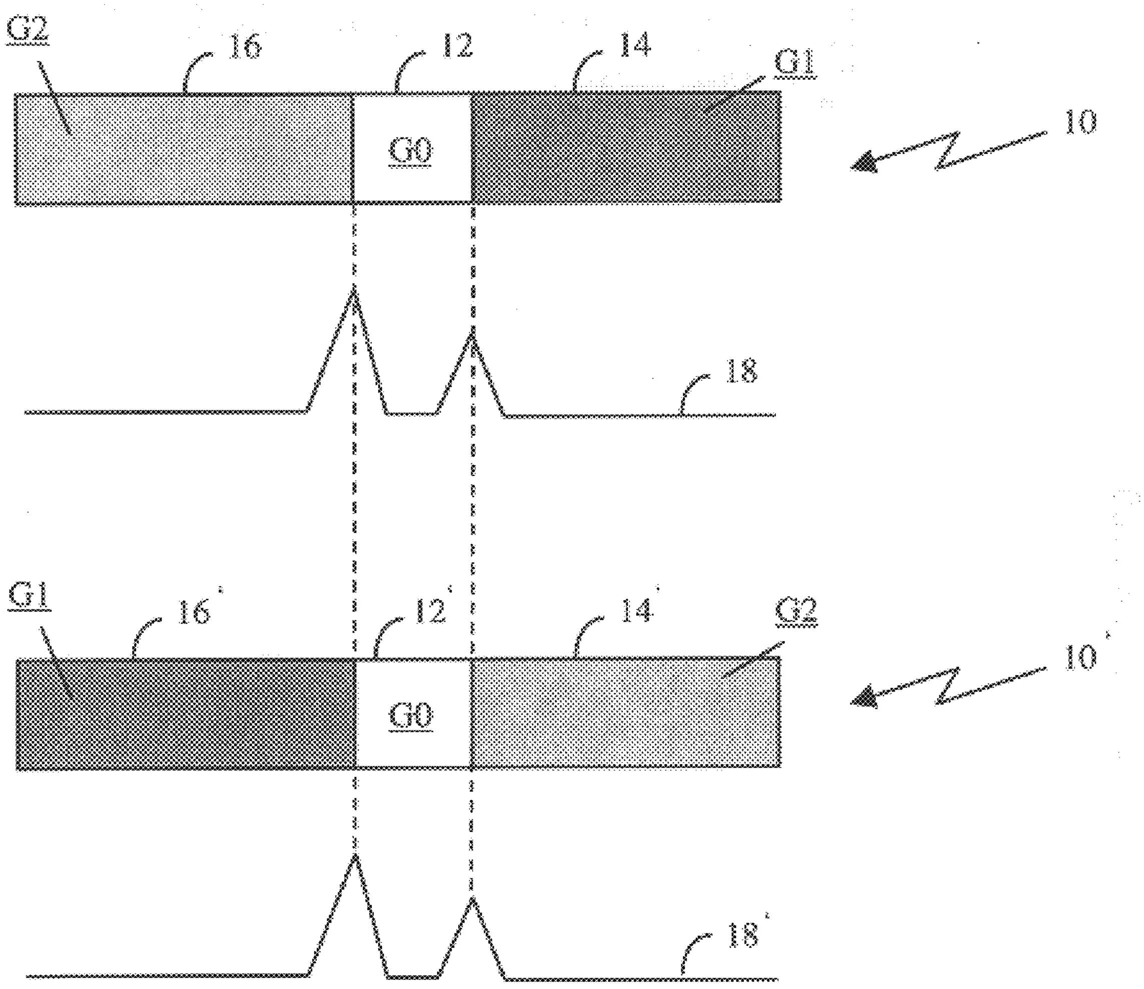
FIG. 1 is a graphical representation of the gray levels of three areas of a reference feature, and the corresponding plot of the gradient of gray level across the areas, both before and after a process step.
Figure 1A:
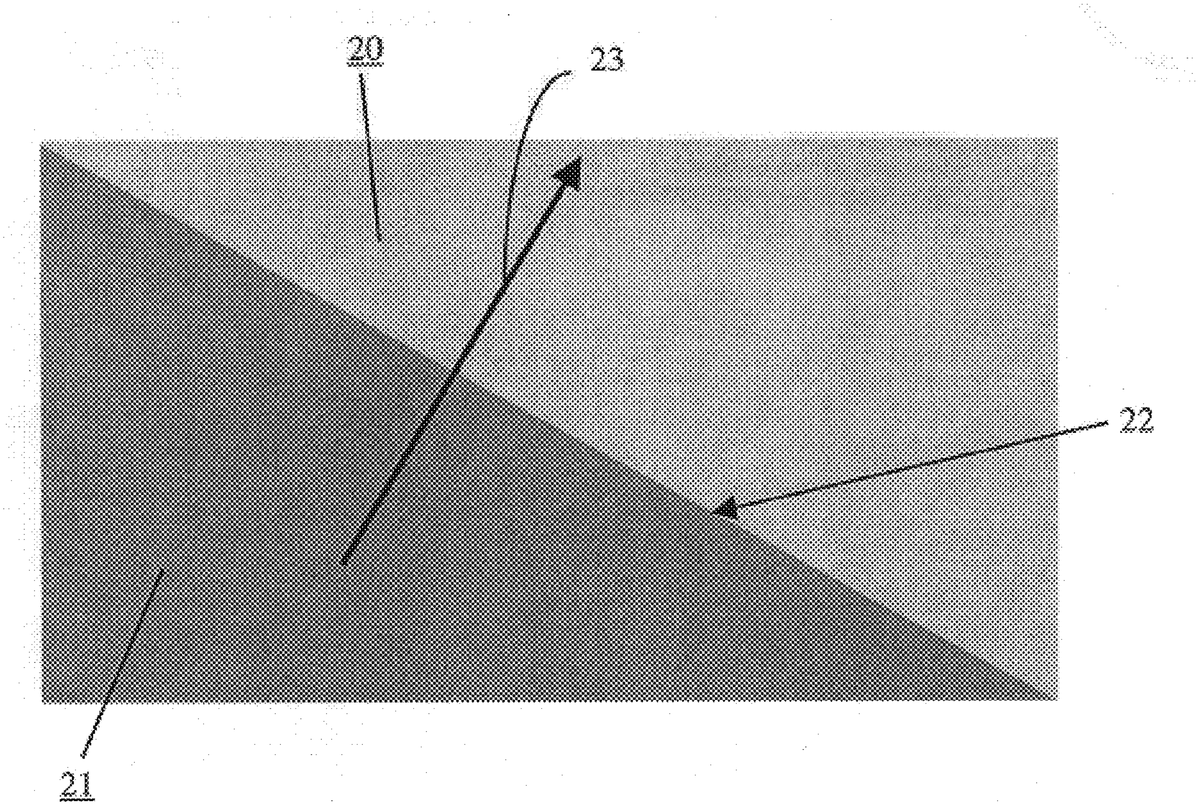
FIG. 1A is a graphical representation of an edge, and the direction of the edge.

An image consists of an array of pixels. A pixel is a picture element characterized by a gray value. Referring to FIG. 1A, the boundary between two different regions 20 and 21 of image pixels (very small in this figure) is the "edge" 22. Each region 20 and 21 has pixels of substantially uniform gray values. An edge consists of a plurality of connected edge elements or edge pixels (very small in this figure) that correspond to underlying image pixels. An edge can be one or more edge pixels wide. Each edge pixel is associated with an edge magnitude and an edge direction 23. The magnitude of an edge pixel is the difference in gray values between image pixels that underlie the edge pixel. The direction 23 of an edge pixel is typically expressed as the angle of a line which is drawn perpendicular to a tangent to the edge at the edge pixel position. An array of edge pixels (or edge elements) is called an "edge map".

The process of generating an edge map from a given image, i.e., determining which pixels of an image are associated with edge pixels, is called edge detection. The invention performs enhanced edge detection by locating a subset of "true peak" edge pixels. If the edge map is viewed as a terrain, wherein the edge magnitude at each (x,y) position of the edge map is the height (z) above a plane at z=0, then the subset of true peak edge pixels are those edge pixels that form the peak of one or more extended ridges in the terrain. As recognized by the invention, the position of an edge, when detected using the enhanced edge detection methods of the invention, is substantially invariant with respect to non-uniform brightness changes over a sequence of images of an object feature.

Figure 1B:
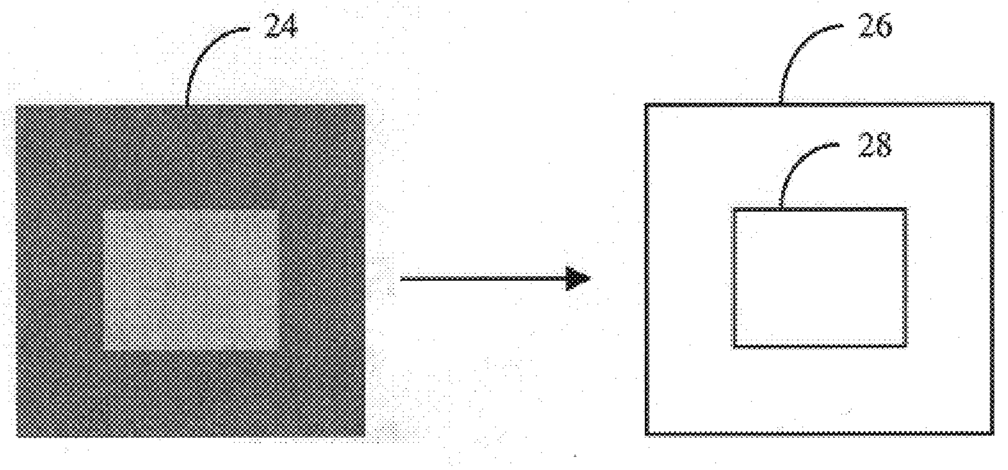
FIG. 1B is an example of an image and its edge map having two square concentric regions of different gray values.

The invention performs edge detection in both the model image and the test image and creates edge maps of both images. A binarized edge map is a transformation of an edge map wherein the transformation results in either a '0' or a '1', representing 'edge' and 'non-edge' elements, respectively. FIG. 1B shows a gray scale image and a corresponding binarized edge map created from that image. The edges 26 and 28 represents a set of binary edge pixels having the value '1', where all the remaining binary edge pixels have the value '0', i.e., 'no-edge'.

When a search is performed with the invention, the portion of the test image's edge map which is most closely correlated to the model image's edge map is found.

Figure 2:
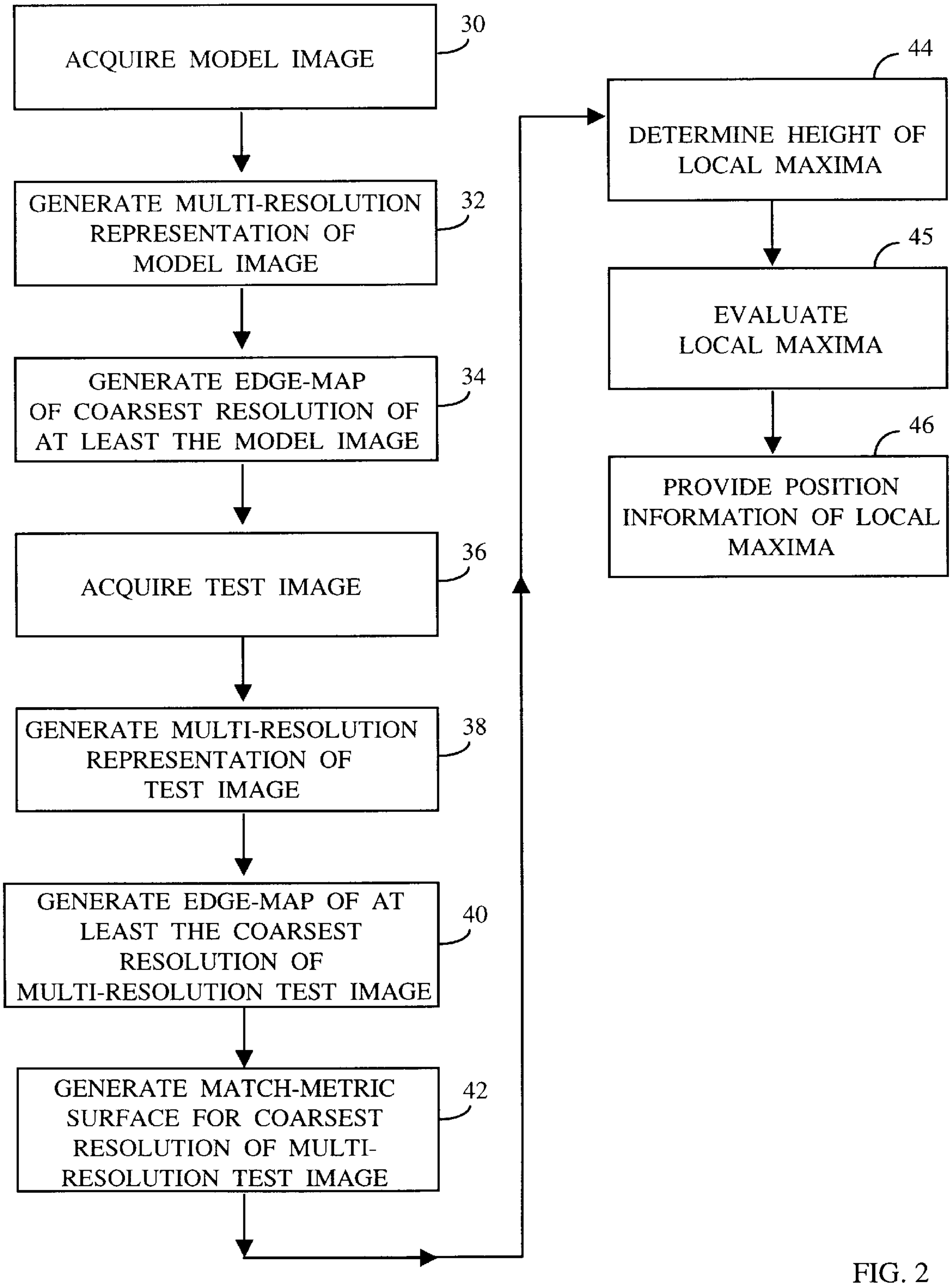
FIG. 2 is a top-level flow chart of the method of the invention.

Referring to FIG. 2, the method and apparatus of the invention finds a model image, i.e., an image of a "known good" sample or object, within a test image, i.e., an image of a scene that may contain the sample or object, or a feature thereof, by first acquiring the model image (30) at train-time, then generating a multi-resolution representation of the model image (32), and deriving an edge map of the coarsest resolution level of the multi-resolution representation of the model image (34), also at train-time.

At run-time, a test image is acquired (36), a multi-resolution representation of the test image is generated (38), an edge map of the coarsest resolution level of the multi-resolution test image is generated (40), and then the edge map of the coarsest resolution level of the multi-resolution representation of the model image is used to generate a match-metric surface (42). The resulting match-metric surface is analyzed to determine the characteristics of the local maxima of the match-metric surface, such as the height (44). The local maxima having a height above a user-selected threshold are then further examined (44) by a process to be described below to verify that each local maximum corresponds to an actual instance of the model image within the test image.

The position of each verified local maximum can represent the location of a feature of a real object, and this position information can be provided (46) to an alignment device, such as a wafer stepper., or other device that requires position information.

Generally, at train-time, a model image is acquired (30) using, for example, a CCD camera, or other image digitizing device (see FIG. 9). The model image can also be acquired by synthetic training according to a pre-determined specification of the model image.

To generate a multi-resolution representation of the model image (32) that includes a plurality of single-resolution model images, the following steps are executed once for each resolution level required in the final multi-resolution representation. In a preferred embodiment, two resolution levels are generated in addition to the model image directly acquired: a fine level and a coarse level.

First, a border of pixels is added around the perimeter of the model image (or a reduced-resolution image from a previous step) to provide a image, and then the smoothed image is sampled to provide a reduced-resolution image.

Smoothing is accomplished by convolving a smoothing kernel, such as a Gaussian kernel, with the model image (or the reduced-resolution image from a previous step). If a Gaussian kernel is used, the resulting multi-resolution representation will be a Gaussian pyramid, as described in "The Laplacian Pyramid as a Compact Image Code", IEEE Trans. on Comm., Vol. Com-31, No. 4, April 1983, P. 533–534, herein incorporated by reference. A Laplacian Pyramid, or any other multi-resolution representation that preserves image edge information, can also be used as the multi-resolution representation.

To smooth the image, each pixel in the image is replaced by a local weighted average using the smoothing kernel centered on the pixel. In a preferred embodiment, the smoothing kernel can be a 3×3 or a 5×5 matrix of weights that approximates a Gaussian kernel, for example.

In a preferred embodiment, for providing enhancement of computational speed, the 3×3 Gauss approximation kernel is convolved with the image to be smoothed using the VC-2 image co-processor sold by Cognex Corporation.

If the kernel is a 3×3 matrix, then the border added before smoothing is one pixel deep, and is just a copy of the nearest perimeter pixel of the image to be smoothed. If the kernel is a 5×5 matrix, then the border added before smoothing is two pixels deep, and can be a double copy of the nearest perimeter pixel of the image to be smoothed, or can be a reflection of the nearest perimeter pixel, and the next-nearest perimeter pixel, for example. In general, prior to smoothing, each image (the original and the lower resolution images in the multi-resolution representation) is extended with a border that is one half of one less than the kernel size. So, for a 5×5 kernel, the border is (5−1)/2, i.e., 2 pixels wide.

In a preferred embodiment, at run-time, a border is not added to the lower-resolution images of the multi-resolution representation of the test image.

Sampling of the smoothed image is performed by keeping only one quarter of each 2×2 pixel sub-part of the image, for example, just the upper-right pixel of each sub-part having four pixels. The resulting sampled image is one half the height and one half the width of the original image, having one fourth as many pixels, and one half the resolution as the original image. Of course, one could keep one ninth of each 3×3 pixel sub-part of the image, etc., although 2×2 pixel sub-parts are preferred, in accordance with Nyquist's Theorem. Also, if an image overwhelmingly contained more horizontal than vertical features, a 2×1 sub-part could be used, where one of the two horizontal pixels are kept at each sampling step, for example.

Thus, a multi-resolution representation of the model image results when an image is repeatedly smoothed and sampled. One benefit of repeated smoothing and sampling recognized by the invention is that there is significant data compression introduced by each sampling step, thereby reducing computation time.

The number of times an image is repeatedly smoothed and sampled, and therefore the number of levels N in the multi-resolution representation, is preferably two. However, other numbers of levels are possible and useful, and the number of levels N depends on the particular application. One useful heuristic is as follows:

$$N=\log_2(s/m) \quad \text{Equation 1}$$

where s is the lesser of the dimensions 'w' and 'h' (in pixels) at the finest resolution level of an image defined to be the model, and m is the minimum model size, i.e., a minimum value for the lesser of the dimensions 'w' and 'h' (in pixels) at the coarsest resolution level of the image defined to be the model. In other words, in the multi-resolution representation, the number of levels N is chosen such that, at the coarsest level, the lesser of the dimensions 'w' and 'h' is greater than the minimum model size, e.g., greater than 32 pixels in the case of some semiconductor applications.

For other applications, the number of levels N in the multi-resolution representation can be found by measuring the rate of drop-off of the auto correlation function at each candidate resolution level. A candidate resolution level is used in the multi-resolution representation if the rate of drop-off is higher than an empirically derived application-specific threshold, resulting in some number of levels N in the multi-resolution representation.

To generate an edge map of the coarsest resolution level of the model image (34) at train-time, the steps (48, 50, and 52) of FIG. 3 are executed. First, a preliminary edge map of the coarsest level of the multi-resolution representation of the model image is generated (48). This step (48) can be accomplished using a Sobel edge detector, for example, or any other edge operator that provides edge magnitude and orientation information. The Sobel edge operator is additionally advantageous because it can be convolved with the image to be edge-detected using the VC-2 vision processor sold by Cognex Corporation, and the subject of co-pending application Ser. No. 07/891,955, which reduces the computation time required to generate the edge map.

The resulting edge map of the coarsest resolution level includes a plurality of edge pixels, each edge pixel being associated with a magnitude value and an orientation value. Some of the edge pixels in the edge map do not represent real edges in the original image, and some of the edge pixels are not necessary for the later steps (42) of generating a match-metric surface. Consequently, it is recognized by the invention that these pixels contribute computational overhead without providing improved accuracy, and may even degrade accuracy, and therefore should be removed from the edge map.

To eliminate spurious and superfluous edge pixels, and to consequently improve the speed and accuracy of the invention, in a preferred embodiment, a variety of edge pixel reduction techniques are employed. For example, in step (50), all but the "true peak" edge pixels are eliminated from the edge map of step (48).

Figure 4:
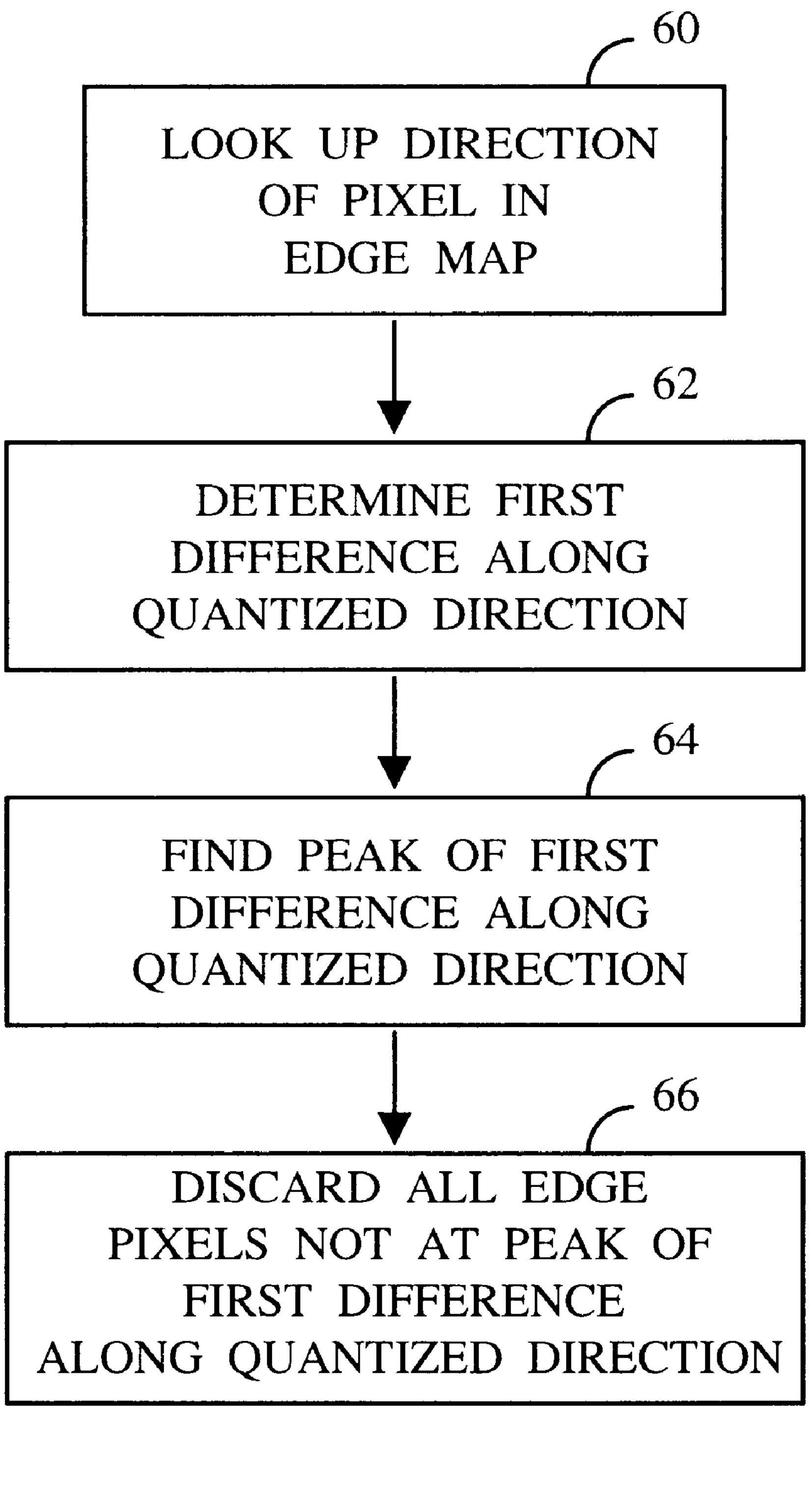
FIG. 4 is a flow chart of the step of eliminating all but "true peak" edge pixels of FIG. 3.

Referring to FIG. 4, to eliminate all but the "true peak" edge pixels, all edge pixels that are not coincident with a local maximum or peak of the edge map are eliminated, where the local maximum is taken along the direction of each edge pixel. The direction of the edge pixel is quantized, for example, such that the direction is one of N, NE, E, SE, S, SW, W, or NW. To eliminate all but the "true peak" edge pixels, the direction of each edge pixel in the edge map is looked up (60). Then, the first difference of the corresponding image pixels is computed along the quantized direction of the edge pixel (62). In a preferred embodiment, this first difference is looked up in a table of first difference results obtained from previously computed edge detection operations. Next, the peak (i.e., maximum) of this first difference taken along the direction of the edge pixel is found (64). If the peak is not coincident (i.e., in overlapping relationship) with an edge pixel, that edge pixel is discarded (66).

In a preferred embodiment, in the cases when the "peak" consists of two or more edge pixels of the same edge magnitude for a given quantized direction, then it is useful to reduce the number of these edge pixels. If it is assumed that, for edge pixels of the same edge magnitude for a given quantization direction, edge pixels disposed farther along the given quantization direction are retained in preference over "nearer" edge pixels. For example, if the given quantization direction is W (right-to-left), then for two otherwise equivalent neighboring edge pixels, the left-most edge pixel will be selected as the "true peak" edge pixel. Returning to FIG. 3, in a preferred embodiment, hysterisis edge pixel selection is then performed (52). Referring to FIG. 8, hysterisis edge pixel selection is another way to eliminate extraneous edge pixels of an edge map, thereby improving the speed and accuracy of the invention at both train-time and at run-time. In particular, the speed of the step of computing the match-metric surface (42) can be significantly improved.

To perform hysterisis edge pixel selection, for each edge pixel, a comparison is made (68,70) between the magnitude of the edge pixel and one or both of two thresholds: a 'high' threshold and a 'low' threshold. If the magnitude of the edge pixel is greater than or equal to the 'high' threshold (68), the edge pixel is kept (72). Then, in a preferred embodiment, the value of the edge pixel is binarized (73), i.e., converted to logic value '1'. In other embodiments, the value of the edge pixel can be used directly without binarization. Else, the magnitude is compared with the 'low' threshold (70), and if it is found to be less than the 'low' threshold, then it is discarded (74), and in a preferred embodiment, the discarded edge pixel is accorded the logic value '0' (75). Else, a determination is made as to whether the pixel is part of a continuous path that includes a pixel of a magnitude that is greater than or equal to the 'high' threshold (76). If it is, then the edge pixel is kept (77), and then binarized (78), else, it is discarded (79).

The steps of FIG. 8 can be executed with substantial efficiency by use of the method disclosed and claimed in the co-pending patent application entitled "Object Edge Point Filtering System for Machine Vision", application Ser. No. 08/579,958, filed Dec. 28, 1995, assigned to Cognex Corporation.

Returning to FIG. 2, at run-time, a test image is acquired (36) with an image digitizer, and a multi-resolution representation of the test image is generated (38) in the same manner that the multi-resolution representation of the model image was generated in step (32). Then, an edge-map of the coarsest resolution level of the multi-resolution representation of the test image is generated (40).

Referring again to FIG. 3, at run-time, in a preferred embodiment of step (40), after the preliminary edge map is generated (48), using for example, a Sobel edge detector, all but "true peak" edge pixels are eliminated (50) in a manner as described above.

The next step at run-time is to generate a match-metric surface in a match-metric space for the coarsest level of the multi-resolution representation of the test image (42). The match-metric surface has a match-metric value at each allowable relative translation of the model image with respect to the test image. The match-metric surface can be generated using exhaustive normalized correlation (bi-level or multi-level intensity), and can be generated using exhaustive registration using a sum-of-absolute-differences metric (bi-level or multi-level intensity). Also, a "sum of similars" metric can be used wherein the match-metric M is:

$$M_{i,j}=3_{u}^{w}3_{v}^{h}I_{i+u,j+v}\text{æ}M_{u,v} \qquad \text{Equation 2}$$

where æ is the logical AND operator, and I and M are images representing the binarized edge maps of the run-time test image and the model image respectively. In other words, it is required that the magnitude of each pair of edge pixels must match for the logical value of the pair to contribute to the summation. The performance of the metric of Equation 2 is further enhanced if it is also required that the orientation of each pair of edge pixels must match for the logical value of the pair to contribute to the summation.

In a preferred embodiment, the match-metric surface is computed using a technique that is suited for matching only edge pixels, i.e., a technique that has a computational complexity that is of order O(e), i.e., linear in 'e', where 'e' is the number of edge pixels to be matched. One such technique is the Generalized Hough Transform (GHT). This technique is well-known in the art, and is explained in the book *Computer Vision* by Ballard and Brown, Prentice Hall 1982, pp. 128–131, incorporated herein by reference.

The basic strategy of the Generalized Hough Transform (GHT) is to compute possible locations of instances of the model image in the test image based solely on edge pixel data in the edge maps derived from the model image and the test image, respectively. A match-metric is computed for each different relative displacement of the model image edge map with respect to the test image edge map, thereby forming a 3-D match-metric space. The height of each point on the surface in match-metric space represents the accumulated evidence that it is the origin of the model image, based on the associated relative displacement. Thus, a true location of an instance of the origin of the model image should be indicated by a local maximum of the surface in match-metric space. Preferably, the height of the local maximum will exceed a user-selected threshold.

However, some local maxima that form in the match-metric space do not correspond to an instance of the model image in the test image. Furthermore, even in the cases where a local maxima does represent a real instance of the model image in the test image, the location of the local maximum may not be known to sufficient precision. Accordingly, at least one subsequent matching step of greater precision and selectivity must be performed to ensure that a found local maximum of the surface in match-metric space is in fact a true location of an instance of the model image, and that the location is known with sufficient precision. The degree of precision required depends on the application, and on the needs of the user. Accordingly, the invention enables a user to select the degree of selectivity and precision, as will be explained below.

There are many reasons why a found local maximum would not be the true and precise location of an instance of the model image. For example, image quantization introduces errors that could lead to imprecision in the true location of an instance of the model image. Also, if the test image at run-time includes a noise-degraded instance of the model image, and/or portions of the test image resemble a portion of the model image, spurious maxima can arise in the match-metric surface. The spurious maxima can be higher than even a local maximum associated with the real instance of the model image.

For an illustration of this phenomenon, refer to FIGS. 10A, 10B, and 11 where, for example, an image of a cross 82 serves as the model image. Assume that the cross 82 consists of fifty pixels horizontally, and fifty pixels vertically. A possible run-time image can contain solid vertical and horizontal straight lines 84 and 86, respectively, and an instance of a cross 88 that has been corrupted by noise so as to include only one third of its original pixels.

Recall that the height of a local maximum in match-metric space indicates the likelihood assigned by GHT that the local maximum represents the origin of the model, i.e., the true alignment position.

Referring to FIGS. 10A, and 10B, FIG. 10A shows a model image 82 having the shape of a cross, and FIG. 10B shows a test image 88 having two line elements 84 and 86 that appear to be joined by at an intersection point to form another cross 87. The cross 87 is however, just an artifact, i.e., image noise.

Note that the line segments 84 and 86 resemble portions of the model image 82, and that the spurious cross 87 resembles the model image 82. Also note that there is also a maximum of height 18 at the location (6,3) that corresponds to the origin of the true instance of the model image 82.

Referring again to FIG. 2, next, each local maximum having a height that exceeds the accept threshold (44) is further evaluated (45) using at least one subsequent matching step of greater precision and selectivity to ensure that the local maximum is in fact a true location of an instance of the model image, and that the location of the position of the instance of the model image is known with sufficient precision. This is done for each local maximum until every local maximum has been so evaluated. The step of further evaluating a local maximum is essentially re-searching using a search method more precise and/or more selective than the method used to find the local maximum originally, where re-searching takes place only within a restricted region defined to include only the image feature corresponding to each local maximum, and an additional region to allow sufficient relative displacement between the model image and the restricted region of the test image to be searched. The re-searching can occur using one or more resolution levels within the multi-resolution representation of the test image.

In a preferred embodiment, only one evaluation resolution level is selected by the user, e.g., "coarse" or "fine". If "coarse" is selected, only the coarse level is searched. If "fine" is selected, the coarse level is searched, and then is searched again using a search of even greater precision at the fine level, and within a more restricted area based on the location found by searching the coarse level.

Alternatively, one evaluation level can be selected from among "coarse", "medium", and "fine", where selecting "medium" involves a search of the coarse and medium levels, and selecting "fine" involves a progressively more precise and selective search of the coarse, medium, and fine levels, in that order. Thus, in a preferred embodiment, selection of a single resolution level by a user implicitly selects each level of higher resolution as well.

Figure 5:
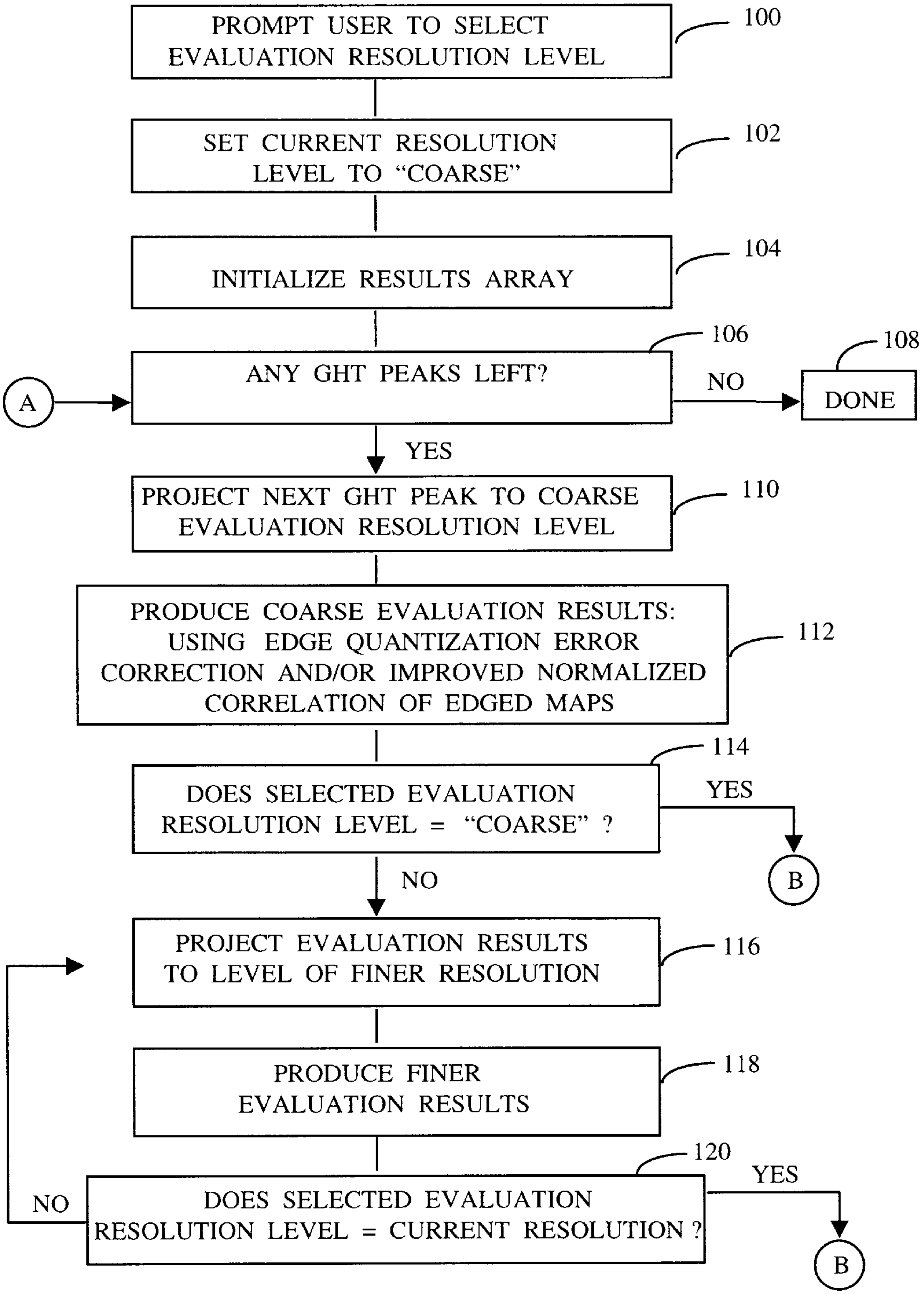
FIG. 5 is a flow chart of the step of evaluating the local maxima of FIG. 2.

Referring to FIG. 5, to perform the evaluation step (45) of FIG. 2, one evaluation resolution level is selected by a user (100). The level selected will be the finest resolution level that the user deems appropriate to the application, based on the user's experience with the particular application, and the factors and heuristics described below. As explained above, all of the resolution levels of lesser resolution that the finest level selected will also be searched. For example if 'medium' is selected, then the medium and coarse resolution levels will be searched. If 'coarse'is selected, then only the coarse level will be searched.

The user selects the evaluation resolution level according to the character of the model and test images, and the speed versus accuracy requirements of the application. The decision in general is guided by which resolution level(s) is(are) determined to have sufficiently searchable features to provide an acceptable level of accuracy. In semiconductor fabrication alignment applications, for example, only one evaluation resolution level is required when the multi-resolution image structure consists of two resolution levels: coarse and fine. However, in other application areas, multi-resolution image structures having more than two levels are possible, wherein more than one evaluation resolution level can be optimal.

Next, the current resolution level is set to 'coarse' (102); this variable will change as each evaluation resolution level is searched.

Then, the results array is initialized (104) so that it contains an array of zeros. The results array contains the results of the evaluation search(es) for instances of the model image in the test image. Each result includes the (x,y) position and the height of a local maximum in the match-metric space, where the height is above the user-selected accept threshold.

A list of peaks in the match-metric space having a height above the accept threshold, ordered according to height, is then checked to determine whether there are any more peaks left in the list to be evaluated (106). If there are no more peaks in the list, evaluation of the peaks is complete (108).

If there are more peaks in the list, the next match-metric peak in the list is projeced to the coarse evaluation resolution level (110). To project a peak in the match-metric surface (a local maximum) to the coarse evaluation resolution level, a projection boundary is defined at the coarse evaluation resolution level so as to include all of the edge pixels in the portion of the edge map that corresponds to the candidate instance of the model image in the test image that is associated with the peak, and so as to include additional "freedom" pixels that immediately surround the included edge pixels. The freedom pixels allow a minimum of relative displacement for performing matching between the edge map of the model image and the edge map of the portion of the test image within the projection boundary.

Next, matching is performed at the coarse evaluation resolution level (112). To acheive superior performance, according to the invention, matching results can be improved by performing edge quantization error correction, and/or by using an improved version of normalized correlation for binary edge maps.

Most known edge detection techniques provide edge position information only to integer precision. The peak evaluation step at coarse resolution needs to accomodate sub-pixel shifts in edge position. If an edge of a feature moves a single pixel under the pixel lattice at a particular resolution, the coarse resolution representation of that edge moves a sub-pixel amount in the coarse resolution image. The coarse resolution evaluation step needs to either operate on a finer lattice, or adjust the evaluation step to be invariant to quantization errors caused by using an integer lattice of edge positions.

In a preferred embodiment of the present invention, quantization errors caused by using an integer lattice of edge positions are repaired. In one version of this embodiment, an "edge map" of the projection boundary area of the test edge map is created. This "edge map" is created using an integer lattice. Next, the "edge map" of the model image is fetched (this edge map was created at train-time). This model image "edge map" has been created with an integer lattice as well. These two edge maps are of the same size and are superimposed one-for-one and compared pixel-by-pixel to match them with respect to each other. This match results in a plurality of possibilities in pixel-to-pixel match outcome between a pixel from the model image "edge map" and a pixel from the projection boundary of the test "edge map", as shown below in Table 1:

TABLE 1

| Model | Projection Boundary | Edge Overlap Type |
|---|---|---|
| No-edge | No-edge | No-edge Match |
| No-edge | Edge | Clutter |
| Edge | Edge | Edge Match |
| Edge | No-edge | Occlusion |
| Edge neighbor | No-edge | NOP |
| Edge neighbor | edge | Repair |

An Edge neighbor is a no-edge pixel in the eight-way neighborhood of an edge pixel. At every position where there is an Occlusion, we look to see if there is a Repair in the immediate 8-way connected neighborhood. If there is a Repair, we re-label both edge overlaps as Matches, as shown in FIG. 12.

In a preferred embodiment, after the repair, a correlation step is performed. In an even further preferred embodiment, the correlation step is the improved normalized correlation for binary edge images described herein. The following is a definition of the improved correlation for binary edge maps that is used in the correlation step, where 'r' is the improved correlation value:

$$r^2=(\text{Match}-\text{Clutter\_bias}*\text{Clutter}-\text{Occlusion\_bias}*\text{Occlusion})^2/(\text{M0}*\text{M1}*\text{I0}*\text{I1})$$

The bias terms in this expression for 'r' provide a "smooth" binary correlation. The Match term is equal to M0*I11, and therefore represents the number of model 0s (no-edges) times the number of edge-to-edge matches (including repairs).

The Clutter term is M1*I01, which is the number of model 1s (edges) times the number of clutter edge overlaps (where the model had an edge pixel but the projection boundary did not). The Clutter bias term is calculated based on the ratio of the average edge magnitudes of the clutter edge overlaps to the edge-to-edge matches. This implies that the closer the Clutter edge overlaps are to the edge-to-edge overlaps, the more visible the Clutter is and therefore it should be weighted higher (negatively). The Occlusion term is M1*I10 which is the number of model 1s (edges) times the number of occlusion edges (where the model did not have an edge but the projection boundary did). The Occlusion bias term is calculated based on one minus the ratio of the average edge magnitudes of the occlusion edge overlaps to the match edge overlaps. This implies that the closer the occlusion edge overlaps are to the match edge overlaps, the more visible the occluded edges are and therefore it should be weighted lower (negatively).

For normalization purposes, the above 'r' is divided by the sqrt of M0*M1*I0*I1. Typically, normalized 'r' is squared for use in computations.

Next, the invention determines whether further evaluation of the peak is called for by the user. If the user selected an evaluation resolution level of 'coarse', then no further projection to finer resolution levels for further evaluation is necessary, and the invention proceeds to the steps indicated at 'B' described in FIG. 6.

Else, the evaluation results at the coarse resolution level are projected to a finer resolution level in the same manner that projection was described above for projection from the match-metric surface to the coarse evaluation resolution level (116).

Then, in a preferred embodiment of the invention, edge quantization errors are corrected, and/or improved normalized correlation is performed at the finer resolution level to provide a finer resolution result. The result includes a match score and an (x,y) position (118).

Next, the invention determines whether further evaluation of the peak is called for by the user. If the selected evaluation resolution level is equal to the current resolution level, then no further projection to finer resolution levels for further evaluation is necessary, and the invention proceeds to the steps indicated at 'B' described in FIG. 6 (120). Otherwise, the invention continues to project to finer resolution levels until the user-selected resolution level is reached.

Figure 6:
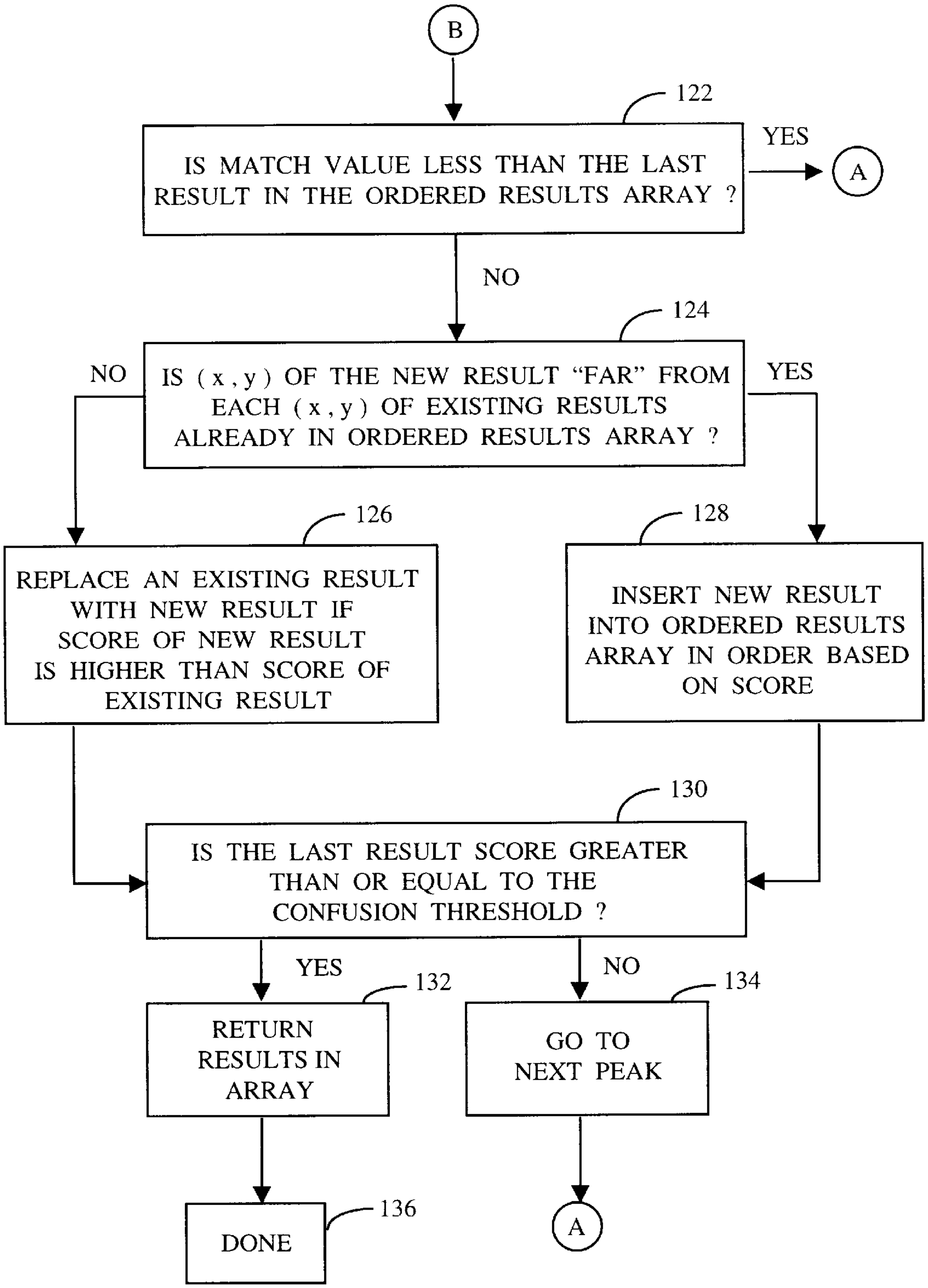
FIG. 6 is a continuation of the flow chart of FIG. 5.

Referring to FIG. 6, after matching has been performed at a particular resolution level, if the match value is less than the match value of the last result in the ordered results array (ordered by descending match value), then that result is discarded, and the next peak is evaluated (122).

Otherwise, it is determined whether the position (x,y) of the new result is "far" from each (x,y) of the existing results already in the ordered results array (124). Here, the meaning of "far" depends on the frequency of occurrence of overlap in the particular application of the user, and must be empirically determined for each application. If the result is not "far", then an existing result in the array is replaced by the new result if the score of the new result is higher than the score of the existing result. If the result is "far", then the new result is inserted into the ordered results array in order based on the score of the new result, to provide a results array with one additional result (128).

If the last result score in the array is greater than or equal to the confusion threshold, then all the results in the array are returned to the user for display, storage, etc. (132), and the routine terminates (136). Otherwise, the next peak in the match-metric space is analyzed, as set forth at 'A' in FIG. 5.

USE AND OPERATION OF THE INVENTION

The invention is useful in any context where an image must be analyzed to obtain position information regarding a pattern in the image and/or to perform alignment based on the image. Thus, the invention is useful for measuring overlay accuracy in, for example, microelectronic photolithography and multi-color printing, and for measuring critical dimensions of small features of integrated circuits, for example.

The invention is particularly useful in applications wherein some or all of a test image undergoes non-uniform changes in brightness of the image of the object, as represented by the test image.

Referring to FIG. 9, a host/controller 132 receives position information from the vision system 134 that operates in accordance with the invention. The vision system 134 receives image data from one or both video cameras 136 and 138 that are disposed so as to acquire images of a substrate or other planar object 140 resting on a manipulator 142. The manipulator 142 can perform at least translations of the substrate or other planar object 140 in response to signals provided by the host/controller 132 that are based on the position information provided to the host/controller 132 by the vision system 134 according to the invention.

The vision system 134 implements the invention to find the location of a pattern, as represented by a model image, in a test image acquired by one of the cameras 136, 138. In addition to returning the location of the pattern of the model image in the test image, the invention also indicates how closely the pattern of the model image in the test image matches the pattern in the model image by returning a match score. The match score indicates how close a match exists between the model image and the image whose location was returned.

In addition to returning the location and match score of the closest match found in the test image, the invention can also return the locations and match scores of other, less similar instances of the model within the test image.

The invention computes two component scores, to be described below, that indicate different aspects of the similarity between the model image and the test image.

The area score is a measure of the similarity between the model image and the search image, taking into account the entire area, i.e., every pixel, of the model image. The edge score is a measure of the similarity between the edge map of the model image and the edge map of the search image, taking into account only those parts of the model image containing edge information, i.e., edge pixels.

The user specifies the area score acceptance threshold (between 0 and 1000) that serves as a threshold for determining whether a match represents a valid instance of the model within the test image. The number of instances of the model expected to be found in the test image can also be specified. The invention will return the location of every instance of the model within the test image that has a score that exceeds the acceptance score, up to the number of instances specified by the user.

The user can also specify a confusion threshold. The confusion threshold is the score (between 0 and 1000) that represents the highest score that an image feature which is not an actual instance of the model will receive. The confusion threshold should always be greater than the acceptance score.

The confusion threshold selected by the user depends in part on the nature of the image being searched. The user should specify a high confusion threshold when the scene contains features that resemble the model but are not valid instances of the model. The user should specify a low confusion threshold when the only features in the scene that resemble the model are valid instances of the model. A properly selected confusion threshold can improve the speed and accuracy of searches.

The component scores are defined as follows:

The area score is derived from the correlation coefficient of the model image edge map and the test image edge map as follows: If the correlation coefficient is less than 0, then an area score of 0 is returned. Otherwise, the area score is computed using this formula:

$$s=r^2\mathrm{A}1000$$

where s is the score and r is the correlation coefficient of the improved normalized correlation described above.

The edge score returned is the percentage of edge pixels from the model image that are also present in the test image, expressed as an integer between 0 and 1000.

Since the area score gives equal weight to both missing edge pixels and extraneous edge pixels in the search image, a low score can be caused by: poorly matched images; and/or well matched images with extraneous edge pixels in the search image.

A user's application distinguishes between these two causes by comparing the area score with the edge score returned for a search. This technique is illustrated in FIGS. 13A, 13B, and 13C. FIG. 13A shows an edge map generated from a model image. FIGS. 13B and 13C show edge maps generated from two test images. The edge map in FIG. 13B shows a poorly matched image. The edge map in FIG. 13C shows a well-matched image that contains extraneous edge pixels. While both test image edge maps have area scores of 450, the second image edge map has a higher edge score, indicating that while the overall pattern of edge pixels is not well-matched between the model image and the test image, almost every edge pixel in the model image is also present in the test image. Thus, by considering both the area score and the edge score, a user can distinguish between low scores caused by poorly matched edge map images and low scores caused by extraneous edge pixels.

We now discuss how to create a model image, i.e., how to train a model. A model image should be selected that includes both pattern information and edge information. Observing the following guidelines will help to select an effective model image:

The model image should include a balance of both strong horizontal and vertical elements; avoid a model that has all horizontal or all vertical features.

Choose a model image that is roughly square; avoid elongated rectangular models.

Select models that contain as much redundancy as possible. A redundant model contains enough elements that there will be something to match even if the model is partially obscured in the test image.

FIG. 14A shows some examples of good models, and FIG. 14B shows some examples of poor models.

When a model is defined and trained, the origin of the model can be specified. When the found location an instance of the model is returned, it will return the point within the test image that corresponds to the origin of the model. If an origin for the model is not specified by the user, the upper-left corner of the model will become the origin of the model image.

The origin of a model can be any point within the model image. Further, the origin of a model can be located outside of the model image. The origin of a model has no effect on the speed, accuracy, or reliability of a search for the model.

We next discusses in more detail the user-selected search parameters that are required when the invention is used to search for an instance of the model image within the test image.

The invention uses the user-selected acceptance score to determine whether or not a match between the model image and a region of the test image represents an actual instance of the model image in the test image. Because of the many variables that affect the search scores that are returned, the best way to select an acceptance score is by conducting a series of test searches using images from an application of interest to the user.

One technique for estimating a confusion score is to perform a search with an acceptance score of 1000 and with the number of expected instances of the model image in the test image is set to one more than there actually is. For example, if the search image contains one instance of the model, search for two instances. The location and score of both the instance and the nearest match will be returned. An effective confusion score will lie between these two scores. As a starting point, a user might select a confusion score that is midway between the two scores.

For this technique to work correctly, the user must set the confusion score for the search to 1000, and set the acceptance threshold really low, e.g., about 100. Setting the confusion score to 1000 forces the most closely matched instances of the model to be located within the search image. Note that since the score for the actual instance of the model in the search image will probably be less than 1000, it may be reported that no instances of the model were found in the test image. But the scores reported for non-matching instances of the model will be accurate, enabling the user to estimate an effective acceptance score.

FIG. 17 shows an example of this technique. The test image contains one instance of the model (a cross-shaped fiducial mark). A search for two instances of the model produces a score of 750 for the actual instance of the model and a score of 275 for the second-best match. Consequently, a good starting value for the confusion score in this case would be around 500.

The invention uses the confusion threshold selected by the user to optimize the search process. The confusion threshold is defined as the highest score received by a feature that is not an actual instance of the model. Any feature that receives a score higher than the confusion threshold is guaranteed to be a valid instance of the model.

The confusion threshold will vary depending on the particular test image. Test images with a high degree of confusion contain features that will receive high scores even though they are not valid instances of the model. Test images where the only features that receive high scores are valid instances of the model have a low degree of confusion. FIGS. 18A and 18B shows examples of scenes with low and high degrees of confusion, respectively.

The invention will search the image until it finds a feature with a score greater than the confusion threshold. As soon as a feature (or features) is found with a score that exceeds the confusion threshold, the tool will terminate the search and return the location of the feature(s). If no features in an image receive scores above the confusion threshold, then the invention will exhaustively search for features with scores above the acceptance score, and will return the location of the feature with the best score.

If the test image has a low degree of confusion, the speed of the search can be increased by specifying a low confusion threshold. As soon as a feature with a score that exceeds the confusion threshold is found, the search will terminate and return the location of that feature.

If the test image has a high degree of confusion, a high confusion threshold should be specified. This will force an exhaustive search of the image to be performed. This will ensure that the presence of confusing features in the image will not cause the valid model instance within the image to be overlooked.

A user should never specify a confusion threshold that is less than the acceptance score.

When the invention returns the location it found an instance of the model within the test image, the location is defined as the location within the test image which corresponds to the origin of the model.

The invention uses information from within and around the model area to compute the precise location of the model within the test image. It the model is found at or near the edge of the test image, then this computation will be slightly imprecise. The invention will indicate in the search results if it found the model at the edge of the test image.

The following is a description of the parameters used by a preferred embodiment of the invention which determine how a search is conducted:

In a preferred embodiment, METHOD can be either COARSE or FINE. If the user specifies COARSE, then the accuracy of the search will be approximately +/−2 pixels. If the user specifies FINE, then the accuracy of the search will be approximately +/−0.5 pixels. A search made with a method of COARSE will be between 50 and 300 percent faster than the same search made with a method FINE. As explained above, the METHOD selected determines at which resolution level evaluation takes place.

RESULTS is the number of instances of the model that the user expects to find. The location of every instance of the model with a score greater than ACCEPT will be returned, up to the number of RESULTS.

ACCEPT is the acceptance score for a search. ACCEPT must be between 0 and 1000, inclusive. Only those instances of the model with scores greater than ACCEPT will be marked as valid.

CONFUSION is the confusion threshold for the search. CONFUSION must be between 0 and 1000, inclusive, and should be greater than or equal to ACCEPT. Any features with scores greater than or equal to CONFUSION are guaranteed to be valid instances of the model. CONFUSION is used as a hint regarding how confusing the search image is. A high value for CONFUSION will slow the search while reducing the chance that the wrong feature will be found in a confusing scene. A low value for CONFUSION will increase the speed of the search for scenes that are not confusing.

The following results are returned upon completion of a search:

RANK is the degree of similarity of the instance of the model relative to the other instances returned. The best match will have a rank of 1.

FOUND is set to indicate whether or not this instance of the model had a score greater than the acceptance score supplied by the user for the search. If this instance did not meet the user-selected acceptance score, FOUND is set to 0. If FOUND is 1, then the match met the user-selected acceptance score.

on_edge_x is set to a non-zero value if, along the x-axis, some part of the model lies outside, or at the very edge, of the image being searched. If on_edge_x is non-zero, then the accuracy of the position information may be slightly reduced from what it would be if the model was entirely within the test image.

on_edge_y is set to a non-zero value if, along the y-axis, some part of the model lies outside, or at the very edge, of the image being searched. If on_edge_y is non-zero, then the accuracy of the position information may be slightly reduced from what it would be if the model was entirely within the test image.

area_score is a measure of how closely the model image matches the test image, taking into consideration the entire area of the model image. area_score is expressed as an integer between 0 and 1000.

edge_score is a measure of how closely the model image matches the test image, taking into consideration only the parts of the model image that contain edge information. edge_score is expressed as an integer between 0 and 1000.

x and y give the location of the origin of the model within the test image. If an origin was not specified by the user, then x and y will be the upper-left corner of the model within the test image.

Other modifications and implementations will occur to those skilled in the art without departing from the spirit and the scope of the invention as claimed. Accordingly, the above description is not intended to limit the invention except as indicated in the following claims.

What is claimed is:

1. Apparatus for finding a model image within a test image, the apparatus comprising:

model image means for acquiring a model image;

means, connected to said model image means, for generating a multi-resolution representation of said model image, said multi-resolution representation of said model image including a coarsest single-resolution model image, and at least one single-resolution model image of finer resolution;

means, connected to said means for generating a multi-resolution representation of said model image, for performing edge detection upon at least said coarsest single-resolution model image to provide at least a coarsest model image edge map;

test image digitizer means for acquiring a test image;

means, connected to said test image digitizer means, for generating a multi-resolution representation of said test image, said multi-resolution representation of said test image including a coarsest single-resolution test image, and at least one single-resolution test image of finer resolution;

means, connected to said means for generating a multi-resolution representation of said test image, for performing edge detection upon at least said coarsest single-resolution test image to provide at least a coarsest test image edge map;

means, connected to said means for performing edge detection upon said coarsest single-resolution model image, and connected to said means for performing edge detection upon said coarsest single-resolution test image, for computing a match-metric value for each one of a plurality of relative displacements of the coarsest model image edge map, with respect to said coarsest test image edge map, to provide a match-metric surface in a match space;

means, connected to said means for computing a match-metric value for each one of a plurality of relative displacements, for determining characteristic information and height information for each local maximum of said match-metric surface;

means, connected to said means for determining characteristic information and height information, for selecting acceptable local maxima of said match-metric surface using both said characteristic information and said height information for each local maximum; and output means, connected to said means for selecting acceptable local maxima of said match-metric surface, for providing position information of said acceptable local maxima to a manipulation device.

2. A method for finding a model image within a test image, the method comprising the steps of:

acquiring a model image;

generating a multi-resolution representation of said model image, said multi-resolution representation of said model image including a coarsest single-resolution model image, and at least one single-resolution model image of finer resolution;

performing edge detection upon at least said coarsest single-resolution model image to provide at least a coarsest model image edge map;

acquiring a test image;

generating a multi-resolution representation of said test image, said multi-resolution representation of said test image including a coarsest single-resolution test image, and at least one single-resolution test image of finer resolution;

performing edge detection upon at least said coarsest single-resolution test image to provide at least a coarsest test image edge map;

computing a match-metric value for a plurality of relative displacements of the coarsest model image edge map, with respect to said coarsest test image edge map, to provide a match-metric surface in a match space;

determining characteristic information and height information for each local maximum of said match-metric surface;

selecting an acceptable local maximum of said match-metric surface using said characteristic information and said height information for each local maximum; and providing position information of said acceptable local maximum to indicate position of said model image.

3. The method of claim 2, wherein the step of generating a multi-resolution representation of said model image includes the step of:

generating a Gaussian pyramid of said model image.

4. The method of claim 2, wherein the step of performing edge detection upon at least said coarsest single resolution model image includes the step of:

convolving at least said coarsest single-resolution model image with an edge operator.

5. The method of claim 4, wherein said edge operator is an edge operator that provides both edge magnitude and edge angle information.

6. The method of claim 4, wherein said edge operator is a Sobel operator.

7. The method of claim 2, wherein the step of generating a multi-resolution representation of said test image includes the step of:

generating a Gaussian pyramid of said test image.

8. The method of claim 2, wherein the step of performing edge detection upon at least said coarsest single-resolution test image includes the step of:

convolving at least said coarsest single-resolution test image with an edge operator.

9. The method of claim 8, wherein said edge operator is an edge operator that provides both edge magnitude and edge angle information.

10. The method of claim 8, wherein said edge operator is a Sobel operator.

11. The method of claim 2, wherein the step of computing a match-metric value for a plurality of relative displacements includes the step of:

performing a Hough transform of said coarsest test image edge map using said coarsest model image edge map.

12. The method of claim 2, wherein the step of performing edge detection upon said single-resolution model image includes the step of:

discarding edge pixels of at least said coarsest model image edge map.

13. The method of claim 12, wherein the step of discarding edge pixels includes the step of:

discarding all edge pixels except edge pixels that correspond to an edge peak.

14. The method of claim 2, wherein the step of performing edge detection upon said coarsest single-resolution test image to provide a coarsest test image edge map includes the step of discarding edge pixels from said test image edge map.

15. The method of claim 14, wherein the step of discarding edge pixels includes the step of:

discarding all edge pixels except edge pixels that correspond to an edge peak.

16. The method of claim 2, wherein said characteristic information is an area-based match quality score, and wherein the step of selecting an acceptable local maximum of said match-metric surface includes the steps of:

performing an area-based match step using a model edge map to provide an area-based match quality score; and comparing said area-based match quality score of each local maximum to a threshold to determine an acceptable local maximum.

17. The method of claim 16, wherein the step of determining a best local maximum includes the step of:

including each local maxima in a list;

sorting said list in accordance with said area-based match score to provide an ordered list of local maxima; and verifying each local maximum in said ordered list until an acceptable local maximum is found.

18. The method of claim 17, wherein the step of verifying includes the steps of:

projecting said local maximum to at least one evaluation resolution level;

searching for an image feature corresponding to said local maximum at each evaluation resolution level, and providing a match score for each evaluation resolution level; and determining whether said match score satisfies a match threshold at each said evaluation resolution level.

19. The method of claim 18, further including the step of:

determining whether any other local maxima that satisfies said match threshold at each said evaluation resolution level is closer than a minimum acceptable distance in said match space.

20. The method of claim 18, wherein the step of projecting said local maximum to at least one evaluation resolution level includes the steps of:

defining a projection boundary to include image feature pixels at each evaluation resolution level that correspond to said local maximum, and to include additional freedom pixels that surround said image feature pixels.

21. The method of claim 18, wherein a user selects said at least one evaluation resolution level upon which the steps of searching and determining are executed.

22. The method of claim 2, wherein said coarsest model image edge map includes edge direction information, and wherein the step of computing a match-metric value for each one of a plurality of relative displacements includes the step of:

using said edge direction information from said model image edge map to compute said match-metric value.

23. The method of claim 2, wherein the step of performing edge detection on said coarsest single-resolution model image includes the step of:

performing hysterisis edge pixel selection.

24. The method of claim 2, wherein the step of performing edge detection on said coarsest single-resolution test image includes the step of:

performing hysterisis edge pixel selection.

25. A method for planar alignment usable over a plurality of surface-altering process steps, the method comprising the steps of:

repeatedly using the method for finding a model image within a test image of claim 2.

26. The method of claim 2, wherein the step of determining position information of said best local maximum includes the step of:

performing sub-pixel interpolation to determine position information of said best local maximum to sub-pixel accuracy.

* * * * *